United States Patent [19]

Shimizu

[11] Patent Number: 4,552,517

[45] Date of Patent: Nov. 12, 1985

[54] SCROLL TYPE FLUID DISPLACEMENT APPARATUS AND METHOD OF ASSEMBLY

[75] Inventor: Shigemi Shimizu, Gunma, Japan

[73] Assignee: Sanden Corporation, Gunma, Japan

[21] Appl. No.: 513,430

[22] Filed: Jul. 13, 1983

[30] Foreign Application Priority Data

Jul. 15, 1982 [JP] Japan ................................ 57-123522

[51] Int. Cl.$^4$ .......................... F01C 1/04; B23P 15/00

[52] U.S. Cl. ........................................ 418/55; 418/57; 418/109; 29/156.4 R; 29/434

[58] Field of Search .........................., 418/55, 57, 109; 81/3 R; 29/156.4 R, 271, 464, 468, 434

[56] References Cited

U.S. PATENT DOCUMENTS 3,924,977 12/1975 McCullough ......................... 418/57

4,411,604 10/1983 Terauchi .............................. 418/55

FOREIGN PATENT DOCUMENTS 813559 3/1937 France ................................. 418/55

57-193793 11/1982 Japan ............................ 29/156.4 R

*Primary Examiner*—John J. Vrablik

*Attorney, Agent, or Firm*—Banner, Birch, McKie & Beckett

[57] ABSTRACT

A scroll type fluid displacement apparatus, a method of assembling the apparatus, and an adjustment member for use in the assembly method are disclosed. The apparatus includes an end plate through which a hole extends, and a bore formed in an end plate of a fixed scroll. The adjustment tool is inserted through the hole and extends into the bore to adjust the offset of the scroll members.

8 Claims, 10 Drawing Figures

SCROLL TYPE FLUID DISPLACEMENT APPARATUS AND METHOD OF ASSEMBLY

TECHNICAL FIELD

This invention relates to a fluid displacement apparatus, and more particularly, to a fluid displacement apparatus of scroll type, such as a compressor, expander, or pump, and to a method of assembling such an apparatus.

BACKGROUND OF THE INVENTION

Scroll type fluid displacement apparatus are well known in the prior art. For example, U.S. Pat. No. 801,182 discloses a scroll type fluid displacement apparatus including two scroll members, each having a circular end plate and a spiroidal or involute spiral element. These scroll members are maintained angularly and radially offset so that both spiral elements interfit to make a plurality of line contacts between their spiral curved surfaces to thereby seal off and define at least one pair of fluid pockets. The relative orbital motion of the two scroll members shifts the line contacts along the spiral curved surfaces and, therefore, the fluid pockets change in volume. The volume of the fluid pockets increases or decreases depending on the direction of the orbiting motion. Therefore, scroll type fluid displacement apparatus are applicable to compress, expand or pump fluids. For the sake of convenience, the discussion which follows deals only with a scroll type device used as a compressor.

In comparison with conventional compressors of the piston type, a scroll type compressor has certain advantages, such as fewer parts and continuous compression of fluid. However, there have been several problems, primarily in the sealing of the fluid pockets. Sealing of the fluid pockets must be sufficiently maintained at the axial and radial interfaces in a scroll type compressor, because the fluid pockets are defined by the line contacts between the interfitting spiral elements and axial contact between the axial end surfaces of the spiral elements and the inner end surfaces of the end plates.

The principles of operation of a scroll compressor will be described with reference to FIGS. *6a*–*6d*. FIGS. *6a*–*6d* schematically illustrate the relative movement of interfitting spiral elements to compress fluid, and may be considered to be end views of a compressor wherein the end plates are removed and only the spiral elements are shown. As illustrated in FIG. *6a*, the orbiting spiral element 1 and the fixed spiral element 2 make four line contacts at four points A–D to define fluid pockets 3*a* and 3*b*. A part of fluid pockets 3*a* and 3*b* is defined between line contacts D-C and line contacts A-B, as shown by the dotted regions; and also by the contact of the axial ends of spiral elements 1 and 2 with the end plates from which these spiral elements extend. When orbiting spiral element 1 is moved in relation to fixed spiral element 2 center 0′ or orbiting spiral element 1 revolves around center 0 of fixed spiral element 2 with a radius of 0-0′, while the rotation of orbiting spiral element 1 is prevented. The pair of fluid pockets 3*a* and 3*b* thus shift angularly and radially towards the center of the interfitting spiral elements with the volume of each fluid pocket 3*a* and 3*b* being gradually reduced, as shown in FIGS. *6a*–*6d*. The fluid in each pocket is thereby compressed.

Accordingly, if circular end plates are disposed on, and sealed to, the axial facing ends of spiral elements 1 and 2, respectively, and if one of the end plates is provided with a discharge port 4 at the center thereof as shown in FIG. 6, fluid is taken into the fluid pockets at the radial outer portion and is discharged from the discharge port 4 after compression.

In this arrangement, as mentioned above, the two scrolls are maintained angularly offset by 180° to securely define the line contacts. However, if the angular relationship between the scrolls is moved from this formal arrangement, because of inaccuracy in the manufacturing or assembly process, the line contacts break to a degree, thereby adversely effecting the efficiency of the compressor.

SUMMARY OF THE INVENTION

It is a primary object of this invention to provide an efficient scroll type fluid displacement apparatus.

It is another object of this invention to provide a scroll type fluid displacement apparatus wherein the angular relationship between both scroll members is easily and exactly established.

It is still another object of this invention to realize the above objects with a simple construction and assembly technique.

A scroll type fluid displacement apparatus according to this invention includes a housing having a front end plate, and a pair of scroll members. One of the scroll members is fixedly disposed relative to the housing and has an end plate from which a first wrap extends into the interior of the housing. The other scroll member is movably disposed for non-rotative orbital movement within the interior of the housing and has an end plate from which a second wrap extends. The first and second wraps interfit at an angular and radial offset to make a plurality of line contacts to define at least one pair of sealed off fluid pockets. A driving mechanism is operatively connected to the other scroll member to effect its orbital motion, whereby the fluid pockets move and change volume. The fixed scroll member is formed with a bore which has predetermined depth, and the front end plate of the housing is formed with a hole extending completely through it. The hole is adapted to be aligned with the bore by an adjustment member which extends through it into the bore during the assembly of the apparatus to set the angular relationship between two scroll members.

The present invention is also directed to the structure of the adjustment member per se, and to a method for assembling the scroll type fluid displacement apparatus.

Further objects, features and aspects of this invention will be understood from the following detailed description of a preferred embodiment of this invention referring to the annexed drawings.

DETAILED DESCRIPTION OF THE PREFERRED EMBODIMENT

Figure 1:
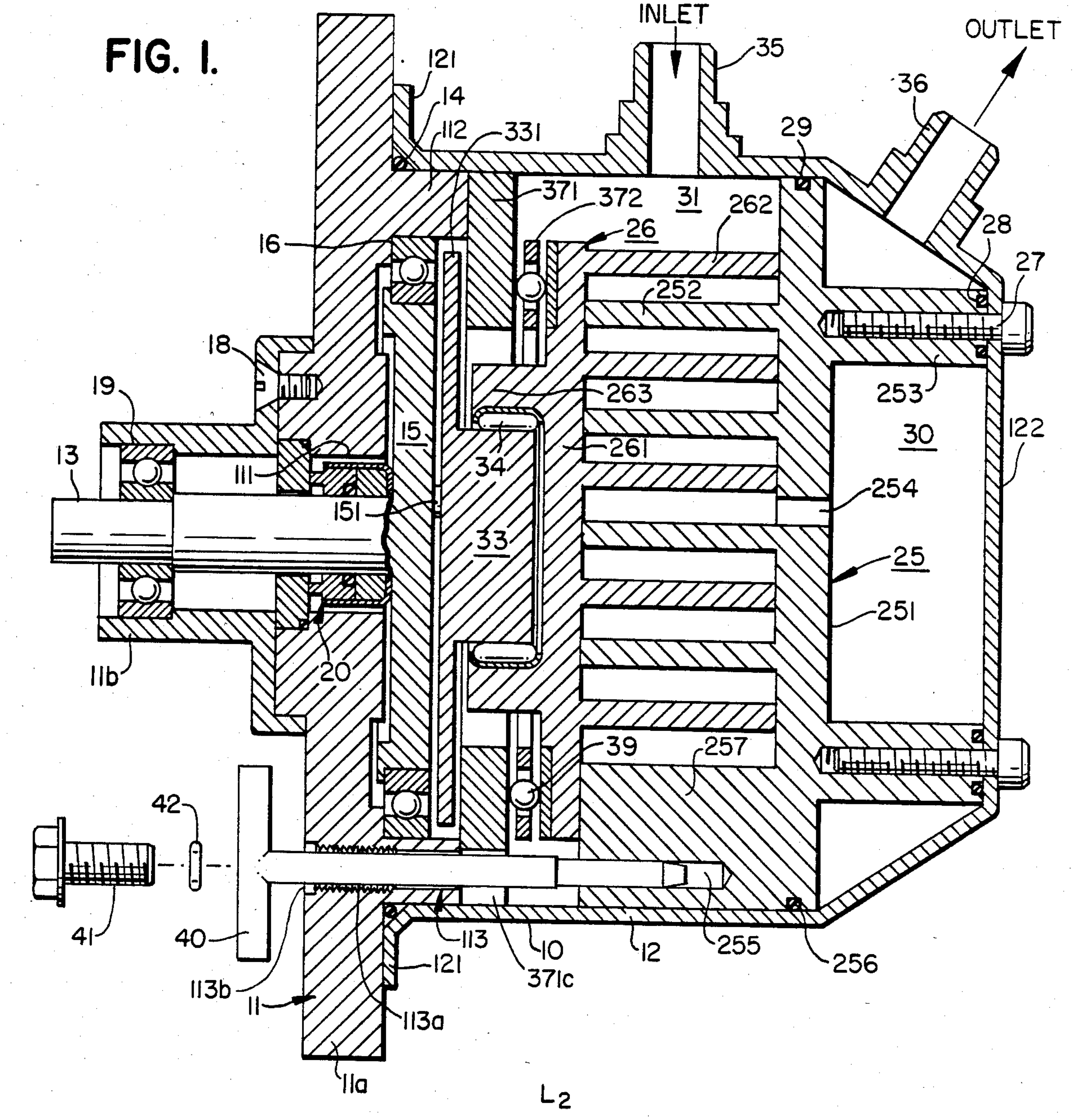
FIG. 1 is a vertical sectional view of a scroll type compressor according to the invention.

Referring to FIG. 1, a refrigerant compressor unit according to the invention is shown which includes a compressor housing 10 comprising a front end plate 11 and a cup shaped casing 12 attached to the end surface of front end plate 11.

In this embodiment as shown in FIG. 1, front end plate 11 comprises a front end plate portion 11*a* and an annular sleeve portion 11*b* projecting from the front end surface of front end plate portion 11*a*. An opening 111 is formed in center of front end plate portion 11*a* for the penetration or passage of a drive shaft 13. An annular projection 112, which projects concentric with and radially spaced from opening 111, is formed in the rear end surface of front end plate portion 11*a* and faces cup shaped casing 12. Cup shaped casing 12 has a flange portion 121 which extends radially outward along an opening portion thereof. An inner surface of the opening portion of cup shaped casing 12 is fitted against an outer peripheral surface of annular projection 112, and an end surface of flange portion 121 is fitted against the rear end surface of front end plate portion 11*a* and fixed to front end plate portion 11*a* by a fastening means, for example, bolt-nuts. The opening portion of cup shaped casing 12 is thereby covered by front end plate portion 11*a*. A sealing member, such as an O-ring 14 is placed between front end plate portion 11*a* and flange portion 121 of cup shaped casing 12 to thereby form a seal along the mating surfaces of front end plate portion 11*a* and cup shaped casing 12. Sleeve portion 11*b* is formed separate from front end plate portion 11*a* and is fixed to the front end surface of front end plate portion 11*a* by screws, one of which is shown as a screw 18. A hollow space of sleeve portion 11*b* forms a continuation of opening 111 of front end plate portion 11*a*. A shaft seal assembly 20 is assembled on drive shaft 13 within opening 111 of front end plate portion 11*a*. Alternatively, sleeve portion 11*b* may be formed integral with front end plate portion 11*a* and also shaft seal assembly 20 may be disposed within the sleeve portion 11*b*.

A fixed scroll member 25, an orbiting scroll member 26, a driving mechanism of orbiting scroll member 26 and a rotation preventing/thrust bearing mechanism of orbiting scroll member 26 are disposed in an inner chamber of cup shaped casing 12. The inner chamber is formed between an inner surface of cup shaped casing 12 and front end plate 11.

Fixed scroll member 25 includes a circular end plate 251 and a first spiral element 252 affixed to or extending from one side surface of circular end plate 251. Circular plate 251 of fixed scroll member 25 is formed with a plurality of legs 253 axially projecting from an end surface opposite to the side of circular plate 251 from which spiral element 252 extends. An axial end surface of each leg 243 is fitted against the inner surface of a bottom end plate portion 122 of cup shaped casing 12 and is fixed to bottom plate portion 122 by screws 27 which screw into legs 253 from the outside of bottom plate portion 122. A first seal ring member 28 is disposed between the end surface of each leg 253 and the inner surface of bottom plate portion 122, to thereby prevent leakage along screws 27. A groove 256 is formed on the outer peripheral surface of circular end plate 251 and second seal ring 29 is disposed therein to form a seal between the inner surface of cup shaped casing 12 and the outer peripheral portion of circular end plate 251. Thus, the inner chamber of cup shaped casing 12 is partitioned into two chambers by circular plate 251, such as a rear chamber 30 and a front chamber 31. Front chamber 31 contains orbiting scroll member 36, the driving mechanism, the rotation preventing/thrust bearing mechanism and spiral element 252 of fixed scroll member 25. Rear chamber 30 contains the plurality of legs 253 of fixed scroll member 25.

Orbiting scroll 26, which is disposed in front chamber 31, also includes a circular end plate 261 and a second spiral element 262 affixed to or extending from one of its side surfaces. Second spiral element 262 of orbiting scroll 26 and first spiral element 252 of fixed scroll 25 interfit at angular offset of 180° and a predetermined radial offset. Fluid pockets are thereby defined between spiral elements 252, 262. Orbiting scroll 26 is connected to the driving mechanism and to the rotation preventing/thrust bearing mechanism. These last two mechanisms effect orbital motion of the orbiting scroll 26 at a circular radius $R_o$ by the rotation of drive shaft 13, to thereby compress fluid passing through the compressor unit.

Cup shaped casing 12 is provided with a fluid inlet port 35 and fluid outlet 36, which are respectively connected to the front and rear chambers 31 and 30. A hole or discharge port 254 is formed through circular end plate 251 at a position near the center of spiral element 252 and connects between the fluid pocket at the spiral elements' center and rear chamber 30.

As the orbiting scroll 26 orbits, line contacts between both spiral elements 252, 262 shift to the center of the spiral elements along the surface of the spiral elements. Fluid pockets, defined between spiral elements 252 and 262, move to the center with a consequent reduction of volume, to thereby compress the fluid in the pockets. Fluid inlet port 35 is connected to front chamber 31 and fluid outlet port 36 is connected to rear chamber 30. Therefore, fluid or refrigerant gas, introduced into front chamber 31 from an external fluid circuit through inlet port 35, is taken into fluid pockets formed between both spiral elements 252 and 262 at the outer end portion of both spiral elements. The fluid in the fluid pockets is compressed, and the compressed fluid is discharged into rear chamber 30 from the fluid pocket at the spiral elements' center through hole 254 and therefrom, discharged through the outlet port 36 to the external fluid circuit, for example, a cooling circuit.

Figure 2:
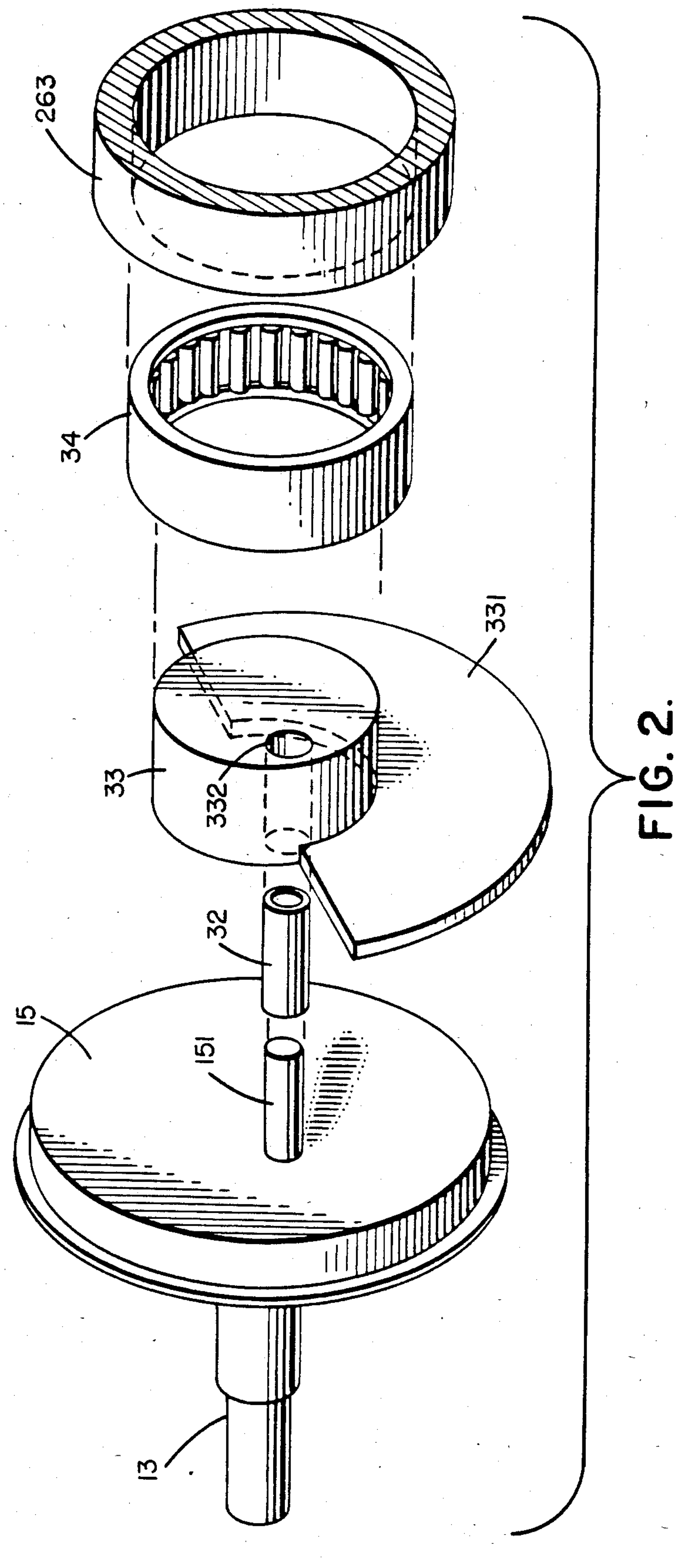
FIG. 2 is an exploded perspective view of the driving mechanism used in the compressor of FIG. 1.

Referring to FIGS. 1 and 2, the driving mechanism of orbiting scroll 26 will be described. Drive shaft 13 is formed with a disk shaped 15 at its inner end and is rotatably supported by sleeve portion 11*b* through a bearing 19 which is disposed within sleeve portion 11*b* and placed outwardly of shaft seal assembly 20. Disk shaped portion 15 is also rotatably supported by front end plate portion 11*a* through a bearing 16 disposed in the inner peripheral surface of annular projection 112.

A crank pin or drive pin 151 projects axially from an end surface of disk portion 15 and, hence, from an end of drive shaft 13, and is radially offset from the center of drive shaft 13. Circular plate 261 of orbiting scroll 26 is provided with a tubular boss 263 axially projecting from an end surface opposite to the side thereof from which spiral element 262 extends. A discoid or short axial bushing 33 is fitted into boss 263, and is rotatably supported therein by a bearing, such as a needle bearing 34.

Bushing 33 has a balance weight 331 which is shaped as a portion of a disk or ring and extends radially outward from bushing 33 along a front surface thereof. An eccentric hole 332 is formed in bushing 33 radially offset from the center of bushing 33. Drive pin 151 is fitted into the eccentrically disposed hole 332 within which a bearing 32 may be applied. Bushing 33 is therefore driven by the revolution of drive pin 151 and is permitted to rotate by needle bearing 34.

Figure 3:
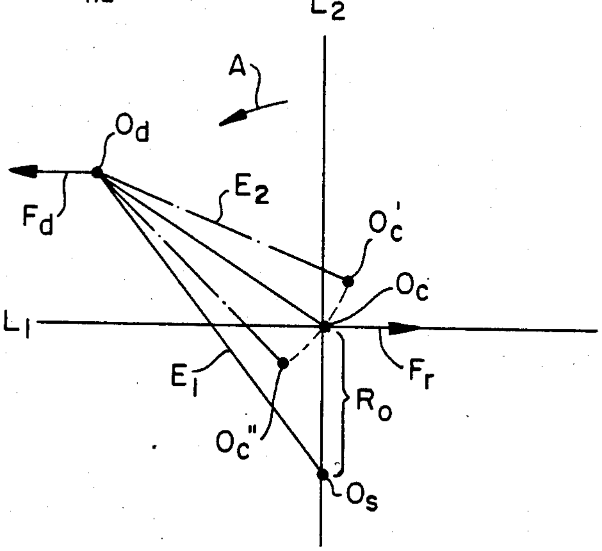
FIG. 3 is an explanatory diagram of the motion of an eccentric bushing.

Respective placement of center $O_s$ of drive shaft 13, center $O_c$ of bushing 33, and center $O_d$ of hole 332 and thus drive pin 151, is shown in FIG. 3. In the position shown in FIG. 3, the distance between $O_c$ and $O_s$ is the radius $R_o$ of orbital motion, and when drive pin 151 is placed in eccentric hole 332, center $O_d$ of drive pin 151 is placed, with respect to $O_s$, on the opposite side of a line $L_1$, which is through $O_c$ and perpendicular to a line $L_2$ through $O_c$ and $O_s$, and also beyond the line $L_2$ through $O_c$ and $O_s$ in the direction of rotation A of drive shaft 13.

In this construction of the driving mechanism, center $O_c$ of bushing 33 can swing about the center $O_d$ of drive pin 151 at a radius $E_2$. As shown in FIG. 3, such swing motion of center $O_c$ is illustrated as arc $O'_c$-$O''_c$. This permited swing motion allows the orbiting scroll 26 to compensate its motion for changes in radius $R_o$ due to wear on the spiral elements or due to dimensional inaccuracies of the spiral element. When drive shaft 13 rotates, a drive force $F_d$ is applied to the left at center $O_d$ of drive pin 151 and reaction force $F_r$ of gas compression appears to the right at center $O_c$ of bushing 33, both forces being parallel to line $L_1$. Therefore, the arm $O_d$-$O_c$ can swing outwardly by creation of the moment generated by the two forces. Spiral element 262 of orbiting scroll 26 is thereby forced toward spiral element 252 of fixed scroll 25 to make at least one point of contact among several pairs of sealing points. The rotation of orbiting scroll 26 is prevented by the rotation preventing/thrust bearing mechanism, wheeby orbiting scroll 26 orbits while maintaining its angular orientation related to fixed scroll 25.

Figure 4:
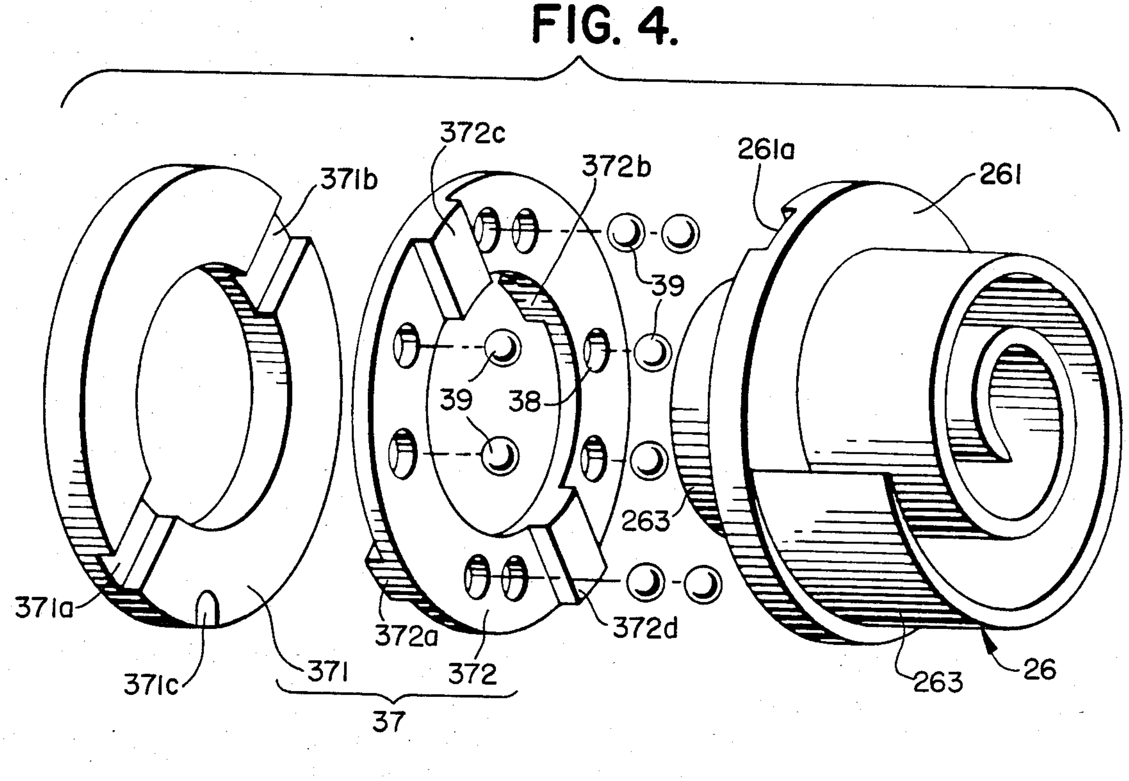
FIG. 4 is an exploded perspective view of a rotation preventing/thrust bearing mechanism used in the compressor of FIG. 1.

Referring to FIGS. 1 and 4, rotation preventing/thrust bearing mechanism 37 surrounds boss 263 and comprises a fixed ring 371 and an Oldham ring 372. Fixed ring 371 is secured to an inner surface of annular projection 112. Fixed ring 371 is provided with a pair of keyways 371*a*, 371*b* in an axial end surface facing orbiting scroll 26. Oldham ring 372 is disposed in a hollow space between fixed ring 371 and circular plate 261 of orbiting scroll 26. Oldham ring 372 is provided with a pair of keys 372*a*, 372*b* on the surface facing fixed ring 371, which are received in keyways 371*a*, 371*b*. Therefore, Oldham ring 372 is linearly slidable relative to fixed ring 371 by the guide of keys 372*a*, 372*b* within keyways 371*a*, 371*b*. Oldham ring 372 is also provided with a pair of keys 372*c*, 372*d* on its opposite surface. Keys 372*c*, 372*d* are arranged along a diameter perpendicular to the diameter along which keys 372*a*, 372*b* are arranged. Circular plate 261 of orbiting scroll 26 is provided with a pair of keyways (in FIG. 4, only one keyway 261*a* is shown, the other keyway is disposed diametrically opposite keyway 261*a*) on the surface facing Oldham ring 372 in which are received keys 372*c*, 372*d*. Therefore, orbiting scroll 26 is linearly slidable relative to Oldham ring 372 by the guide of keys 372*c*, 372*d* within the keyways of circular plate 261.

Accordingly, orbiting scroll 26 is slidable in one radial direction with Oldham ring 372, and is independently slidable in another radial direction perpendicular to the first radial direction. Therefore, rotation of orbiting scroll 26 is prevented, while its movement in two radial directions perpendicular to one another is permitted. Oldham ring 372 is provided with a plurality of holes or pockets 38, and a bearing means, such as ball 39 having a diameter which is greater than the thickness of Oldham ring 372, is retained in each pocket 38. Balls 39 contact and roll on the surface of fixed ring 371 and circular plate 261 of orbiting scroll 26. Therefore, the thrust load from orbiting scroll 26 is supported on fixed ring 371 through balls 39.

In this construction of scroll type compressor, fixed scroll 25 is at least provided with a projection 257 projecting from the outer surface of spiral element 252, and preferably integral with it. A round bore 255, which has predetermined depth, is formed in projection 257 of fixed scroll 25. Front end plate 11 is also formed with a round hold 113. Hole 113 is designed to be aligned with bore 255, in a manner described hereinafter. A part of fixed ring 371 of rotation preventing/thrust bearing mechanism 37 which extends over the end of annular projection 112 to cover hole 113 is formed with a cut portion 371*c* as shown in FIG. 4. Hole 113 has a diameter larger than the diameter of bore 255.

With this arrangement, assembly of the compressor is accomplished by the following method. Fixed scroll 25 is fixed within the interior of cup shaped casing 12 by screws 27. The driving mechanism of orbiting scroll 26, orbiting scroll 26 and a part of rotation preventing/thrust bearing mechanism 37 are assembled on front end plate 11. Then, front end plate 11 is placed in the opening portion of cup shaped casing 12 to close it, and fastening means such as nuts-bolts are temporarily, i.e., loosely, fastened. At this time, an adjustment member 40 is inserted through hole 113 and into bore 255.

Figure 5A:
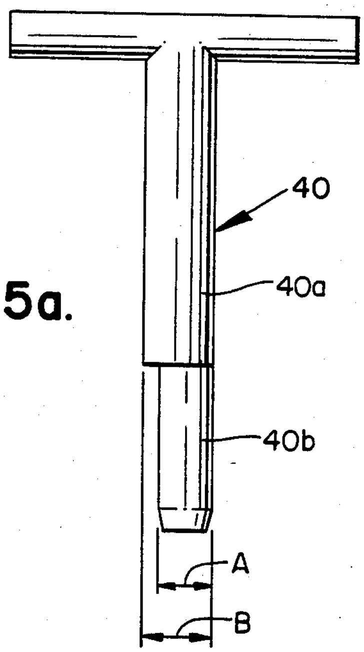
FIG. 5 is a front and side view of the adjustment member of this invention; and FIGS. *6a*–*6d* are schematic views illustrating the relative movement of interfitting spiral elements to compress the fluid.
Figure 5B:
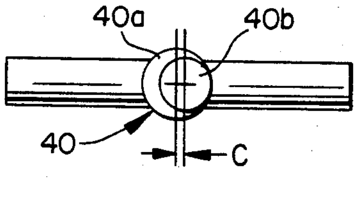
Figure 6A:
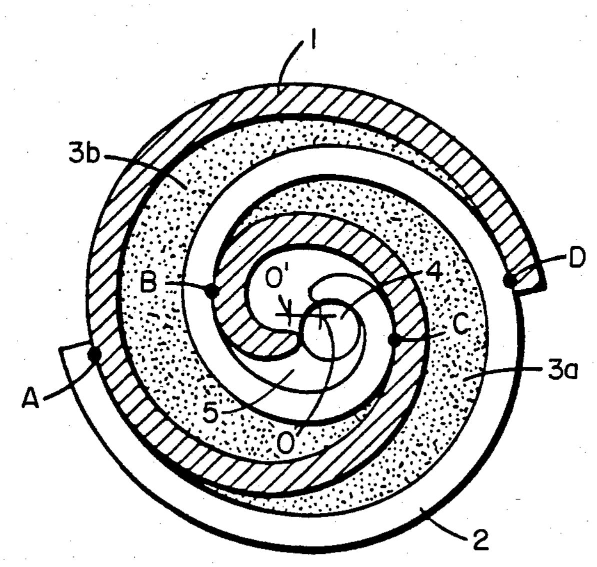
Figure 6B:
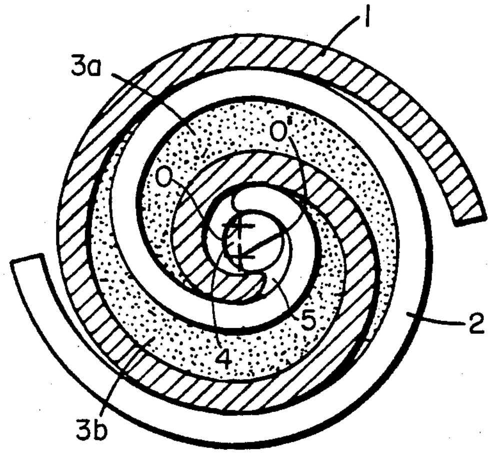
Figure 6C:
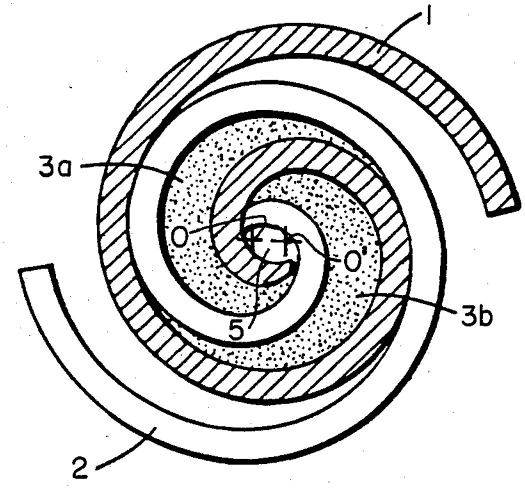
Figure 6D:
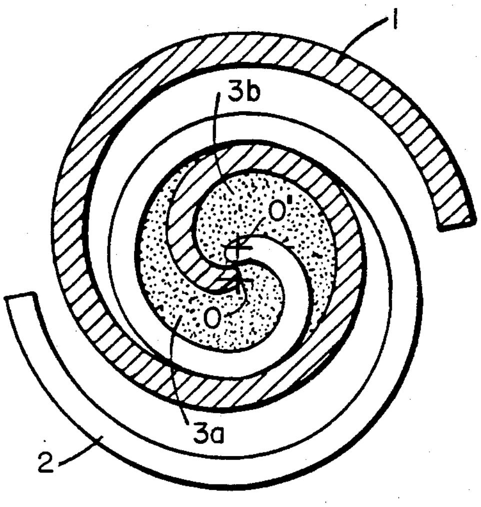

As shown in FIG. 5, adjustment member 40 includes a base portion 40*a* which is formed as a cylinder having a diameter A about the same as the inner diameter of hole 13 and, an end portion 40*b* which is formed as a cylinder having a diameter B about the same as inner diameter of bore 255. When adjustment member 40 is inserted into the apparatus, end portion 40*b* passes into bore 255 and portion 40*a* extends through hole 113. The diameters A and B of portions 40*a*, 40*b* are different and, the center or axis of end portion 40*b* is radially offset from the center or axis of base portion 40*a* by a distance C. Therefore, hole 113 of front end plate 11 may be movable around the bore 255 of fixed scroll 25, i.e., front end plate 11 can be moved relative to casing 12 by the range of the eccentric distance C of adjusting member 40 by the rotation of end portion 40*b* within bore 255.

The angular relationship between both scrolls, can therefore be adjusted and set by rotating adjustment member 40. After the predetermined, desired offset between the scroll members is aligned, adjustment member 40 is removed from compressor unit. The offset between the scroll members is fixed by tightening the fastening means a sufficient degree from its loosened position. A plug 41 is screwed into a screw portion 113*a* of hole 113, and seal ring 42 is disposed within an annular depression 113*b* formed at end portion of hole 113 to form a seal between plug 41 and hole 113 to seal off the inner chamber of cup shaped casing 12.

As mentioned above, fixed scroll 25 and orbiting scroll 26 interfit at an angular offset of 180°, so that a plurality of line contacts are formed between spiral curved surface of spiral elements. However, if the angular relationship between both scrolls shifts due to a dimensional inaccuracy or the assembling process, the line contacts which define the sealed off fluid pockets break off, whereby the efficiency of the compressor drops. In this invention, the angle between the fixed and orbiting scrolls 25, 26 in relation to hole 113 and bore 255 is estimated during the assembly process, and the relative angular offset between scrolls 25, 26 is finally adjusted by adjusting member 40. After adjusting the angular relationship between the scrolls, front end plate is fixed on the cup-shaped casing.

This invention has been described in detail in connection with a preferred embodiment, but this embodiment is merely for example only and this invention is not restricted thereto. It will be easily understood by those skilled in the art that other variations and modifications can be easily made within the scope of this invention, as defined by the appended claims.

I claim:

1. In a scroll type fluid displacement apparatus including a housing having a front end plate, a pair of scroll members, one of said scroll members being fixedly disposed relative to said housing and having a circular end plate from which a first wrap extends into the interior of said housing and the other scroll member being movably disposed for non-rotative orbital movement within the interior of said housing and having a circular end plate from which a second wrap extends, a rotation preventing mechanism operatively connected to said front end plate and said other scroll member, said first and second wraps interfitting at an angular and radial offset to make a plurality of line contacts to define at least one pair of sealed off fluid pockets, and a driving mechanism extending through said front end plate operatively connected to said other scroll member to effect the orbital motion of said other scroll member whereby said fluid pockets change volume, the improvement comprises said fixed scroll member being formed with a bore having a predetermined depth and an open end facing said front end plate, said front end plate having a hole extending completely through it to be placed in substantial alignment with said bore by an adjustment member inserted into said bore through said hole suring assembly of the apparatus to set the angular relationship between both scroll members.

2. The scroll type fluid displacement apparatus of claim 1 wherein said bore is formed on a projection projecting from the outer surface of said first wrap.

3. The scroll type fluid displacement apparatus of claim 1 wherein said hole and bore are round.

4. The scroll type fluid displacement apparatus of claim 3 wherein said bore has a diameter smaller than said hole.

5. The scroll type fluid displacement apparatus of claim 4 in combination with an adjustment member for use during the assembly of the apparatus having a first cylindrical portion of a first diameter to be inserted into said bore and a second cylindrical portion of a second diameter greater than said first diameter to be inserted into said hole, the axis of said first cylindrical portion being offset from the axis of said second cylindrical portion.

6. A method for assembling a scroll type fluid displacement apparatus comprising the steps of:

(a) fixing a casing having at least one opening portion about a fixed scroll member having a circular end plate from which a first wrap means extends;

(b) assembling a driving mechanism and an orbiting scroll member operatively connected to the driving mechanism on a front end plate, and a rotation preventing mechanism operatively connected to said orbiting scroll member and said front end plate, said orbiting scroll member having a second circular end plate from which a second wrap means extends;

(c) placing the front end plate into the opening portion of the casing to interfit the first and second wrap means, and loosely fixing the front end plate to the casing;

(d) inserting an adjustment member into a bore formed in the fixed scroll member through a hole which is formed through the front end plate from the outer side of the front end plate, and adjusting the offset between the fixed and orbiting scroll members by directly positioning the fixed scroll member with respect to the front end plate through the manipulation of said adjustment member;

(e) securely fixing the front end plate to the casing; and (f) closing an open portion of the hole.

7. The method of claim 6 including a step of removing the adjustment member from the casing.

8. The method of claim 6 wherein the adjustment member has first and second cylindrical portions with different diameters, and with offset axes, and step (d) includes rotating the adjustment member to adjust the offset between the fixed and orbiting scrolls to a predetermined offset.

* * * * *

UNITED STATES PATENT AND TRADEMARK OFFICE

CERTIFICATE OF CORRECTION

PATENT NO. : 4,552,517

DATED : November 12, 1985

INVENTOR(S) : Shigemi Shimizu

It is certified that error appears in the above-identified patent and that said Letters Patent is hereby corrected as shown below:

Column 1, line 57, "or" should be --of--;

Column 5, line 39, "wheeby" should be --whereby--;

Column 6, line 40, "13" should be --113--; and

Claim 1, Column 7, line 46, "suring" should be --during--.

Signed and Sealed this

*Twenty-eighth* Day of *January 1986*

[SEAL]

*Attest:*

DONALD J. QUIGG

*Attesting Officer* *Commissioner of Patents and Trademarks*